(12) United States Patent
Roth et al.

(10) Patent No.: US 8,724,815 B1
(45) Date of Patent: May 13, 2014

(54) KEY MANAGEMENT IN A DISTRIBUTED SYSTEM

(75) Inventors: Gregory B. Roth, Seattle, WA (US); Kevin Ross O'Neill, Seattle, WA (US); Nathan R. Fitch, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 101 days.

(21) Appl. No.: 13/248,351

(22) Filed: Sep. 29, 2011

(51) Int. Cl.
*H04L 29/00* (2006.01)

(52) U.S. Cl.
USPC .......................................... 380/270; 713/171

(58) Field of Classification Search
USPC ......................... 380/255, 277; 713/171; 726/6
See application file for complete search history.

(56) References Cited

U.S. PATENT DOCUMENTS

| | | | |
|---|---|---|---|
| 8,011,012 B2 * | 8/2011 | Carle et al. ....................... | 726/27 |
| 8,379,857 B1 * | 2/2013 | Zheng ............................ | 380/255 |
| 2002/0131601 A1 * | 9/2002 | Ninomiya et al. ............ | 380/277 |
| 2008/0319909 A1 * | 12/2008 | Perkins et al. .................. | 705/50 |
| 2012/0155646 A1 * | 6/2012 | Seshadri et al. .............. | 380/279 |

* cited by examiner

*Primary Examiner* — Ali Abyaneh
(74) *Attorney, Agent, or Firm* — Kilpatrick Townsend & Stockton LLP (57) ABSTRACT

Secure information is managed for each host or machine in an electronic environment using cryptographic keys. In some embodiments, a globally distributed system manage and rotate keys across various nodes within the system based on a predetermined schedule of each key's lifecycle. The predetermined schedule decides when keys are created, distributed, and used with respect to each key's pre-assigned time (e.g., an expiration time, a creation time). The schedule of the key's lifecycle may be predetermined and adjusted based on various system requirements. The keys may be automatically rotated throughout the various nodes in the system in a way such that the keys are not unnecessarily exposed for too long but are accessible to the ciphertext producers and the ciphertext consumers when needed. Further, the keys are created and rotated in a way to ensure robustness of the system in the event of a global WAN outage or network partition.

32 Claims, 6 Drawing Sheets

KEY MANAGEMENT IN A DISTRIBUTED SYSTEM

BACKGROUND

As an increasing amount of information is being stored electronically, and as the number of transactions performed electronically increases, there is an ever increasing need to protect sensitive information in an electronic environment. This includes not only securing the storing and transmitting of information, but also securing access to the information. A common approach is to encrypt information using an encryption algorithm or cipher to encode information such that the information can only be decrypted or otherwise interpreted using the same cryptographic key. Managing these cryptographic keys has been a challenge for many organizations for years.

In order to improve security and minimize the risk that an unauthorized user may obtain one of these keys to access information, these keys and other such security items must be stored and maintained in a secure manner. Periodically rotating and changing the keys may improve the security by reducing the chance that keys would be subject to cryptographic attacks. While conventional approaches manually adjust the keys used for encryption and/or decryption, such approaches can become considerably more complex in a distributed environment with a large number of devices that need to have access to particular keys at particular times. Further, a distributed environment may be prone to multi-hour wide area network (WAN) outages and network partitions that could prevent nodes within the network system from having access to the necessary keys at the right time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing sensitive information and/or resources in an electronic environment. In particular, various embodiments manage the lifecycle of cryptographic keys in a distributed system by rotating the keys throughout various locations in the system at different lifecycle phases determined based on each key's pre-assigned expiration time. The system of some embodiments pre-assigns an expiration time for each key at key creation and predefines key lifecycle information that includes the various phases within a key's lifecycle with respect to the pre-assigned expiration time. For instance, a key producer in the distributed system may generate a set of keys and associate each of the set of keys with corresponding predefined lifecycle information. Some embodiments enable key management or automatic key rotation throughout the system by determining the various lifecycle phases of each key with respect to the pre-assigned expiration time. Some embodiments perform this determination by comparing the predefined lifecycle information with the pre-assigned expiration time to determine, for example, a time at which that key becomes active. While some embodiments may determine each key's lifecycle phases based at least in part upon the key's pre-assigned expiration time, some embodiments can determine the lifecycle phases based on any pre-assigned time or any particular point(s) in time within the key's lifecycle. For instance, the various lifecycle phases of a key may be determined based on the key's time of creation or a determined time of activation, etc.

A cryptographic key lifecycle includes several phases between the time it is generated and the time it is deleted or expires. In some embodiments, the key lifecycle includes a creation phase, a caching phase, a distribution phase, a producing phase, a consuming phase, a renewal phase, and an expiration phase. In the creation phase, keys are created centrally within a highly trusted environment in some embodiments. Upon creation, the keys may be cached in trusted key caches, such as one or more key-distribution caches, in the caching phase. In some embodiments, the trusted key caches may be caches near end nodes within the network where the keys may be used. During the distribution phase, keys are distributed to or retrieved by one or more end nodes, such as one or more ciphertext producers and/or one or more ciphertext consumers, to be used. In some embodiments, the keys are distributed out over a network that may be unreliable and prone to temporary partition events during this phase.

During the producing phase and the consuming phase, ciphertext is produced (i.e., messages are encrypted and/or signed) and consumed (i.e., messages are decrypted and/or signature-verified) at various nodes (e.g., ciphertext producers, ciphertext consumers) within the system using one or more keys distributed out over the network. In some embodiments, some messages are desired to be kept around for a period of time that extends beyond the expiration time of the keys used to encrypt the messages. In some such embodiments, the messages are decrypted and re-encrypted with one or more new keys during the renewal phase in order to have a lifetime that extends beyond the lifetime of the keys that were originally used to encrypt the messages. When the keys reach the expiration phase, the keys are deleted or no longer available.

The system of some embodiments predetermines lifecycle information of a key prior to the key being generated using various requirements of the system. Each of the key's lifecycle phases may be determined and pre-established based on the requirements of the system prior to the key being created. In one instance, a prerequisite may be that messages must be readable for eight hours. In another instance, a prerequisite or a security parameter may be that the key must be held in a key-distribution cache or may not be released from the key-distribution cache until twenty-four hours prior to the key expiring. Some embodiments may then pre-establish the key's timeline in a way that would enable the various system requirements to be fulfilled. Taking the various inputs and security parameters into account, the key management system may adjust the key lifecycle (or key lifecycle information) accordingly. Using the pre-established key lifecycle information, some embodiments may then determine the different phases (e.g., creation, distribution, usage, etc.) where each of the phases is a deterministic function of the expiration time.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

Figure 1:
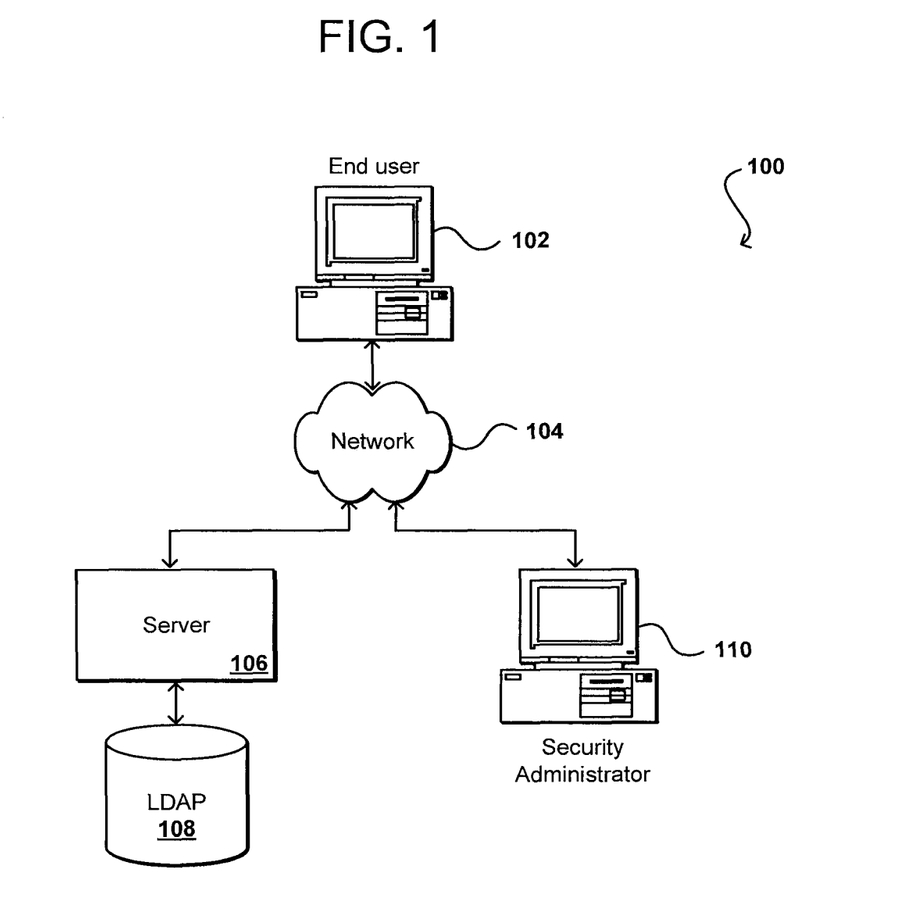
FIG. 1 illustrates an example of a network configuration that can be used in accordance with one embodiment.

FIG. 1 illustrates an example of a network configuration that can be used in accordance with one embodiment. In this example, an end user device 102 is able to connect through a network 104 to access at least one host or server 106. The server might have access to at least one data repository 108 (e.g., Berkeley DB (BDB), distributed cache(s)) for use in serving requests from the user device 102. As discussed elsewhere herein, there can be several types of security used with respect to the user device 102 and the server 106 or database 108, which may be controlled by a security administrator device 110 able to configure and manage security for the server, host, and any related components. For example, the user might send a request for content or a resource that needs to be decrypted by the server 106. In another example, the server might require secure authentication of the user device 102 in order to provide access to services or functionality provided by the server, and may require different security criteria to access and/or store data in the data repository 108. Further, any service and/or application may also require separate security criteria. Various other types of security can be utilized as discussed and suggested elsewhere herein.

Figure 2:
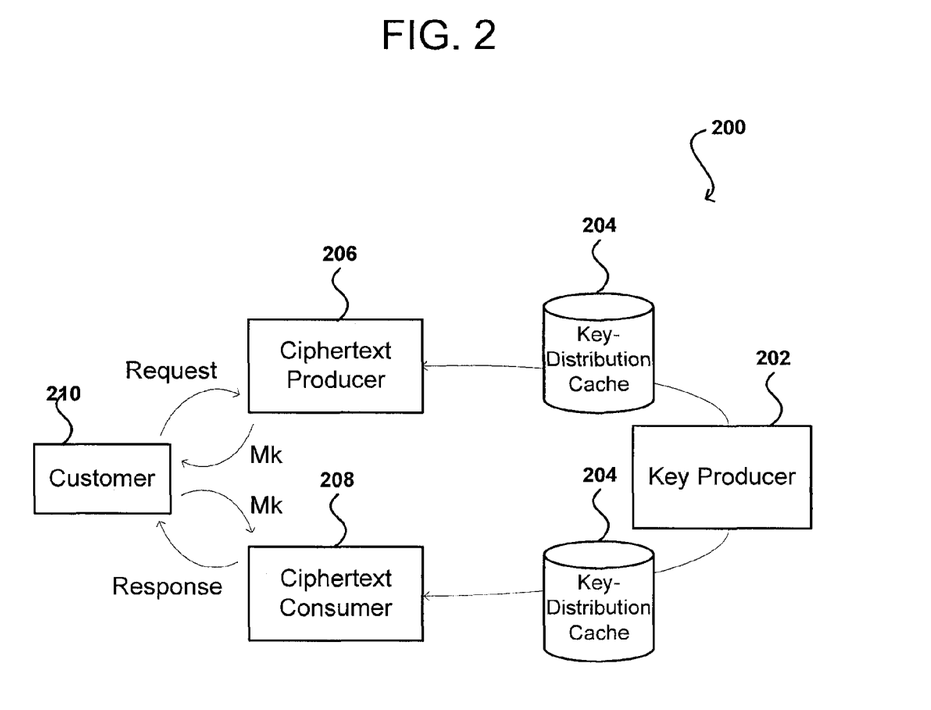
FIG. 2 illustrates an example of a globally distributed system that includes various nodes where keys are created, distributed, and used throughout the different phases within each key's lifecycle in accordance with some embodiments.

Systems and methods in accordance with various embodiments can provide for the management of cryptographic keys during key lifecycle and the various security aspects for such components. FIG. 2 illustrates an example of a globally distributed system 200 that includes various nodes where keys are created, distributed, and used throughout the different phases within each key's lifecycle in accordance with some embodiments. In this example, the various nodes includes a key producer 202, one or more key-distribution caches 204, one or more ciphertext producers 206, one or more ciphertext consumers 208, and one or more customers 210. One of ordinary skill would recognize that the system may include additional or fewer nodes and that each entity (e.g., ciphertext producer 206, ciphertext consumer 208, etc.) depicted here in this figure may represent a large number of nodes that are distributed globally.

In some embodiments, the globally distributed system 200 includes a key producer 202 that generates keys. The key producer may pre-assign an expiration date for each of the keys during the creation phase of a key's lifecycle. The system of some embodiments may have only one key producer. In some embodiments, the keys generated at the key producer are distributed to one or more key-distribution caches 204 during the caching phase of a key's lifecycle. The system of some embodiments distributes the keys to the key-distribution caches upon creation at the key producer. Some embodiments hold the keys in the key-distribution caches for a period of time before the keys may enter the distribution phase of the key's lifecycle. In some embodiments, the keys are created by the key producer in a highly trusted environment and are held in trusted key-distribution caches prior to the distribution phase. In some such embodiments, the keys are considered secure and trustworthy prior to entering the distribution phase where the keys are distributed out over a global network that may be unreliable and prone to temporary partition events. As mentioned, the keys are not activated or remain in a pre-operational state when they are distributed to the key-distribution caches in some embodiments.

In some embodiments, each key is pre-assigned an expiration time when the key is created at the key generator. The system of some embodiments predetermines a timeline for each of the keys where the various lifecycle phases (e.g., creation phase, distribution phase, etc.) of the key is deterministic based on the pre-assigned expiration time of the key. For instance, a key that has been assigned an expiration time of x may have a predefined lifecycle based on the assigned expiration time such that the key automatically enters the caching phase a week prior to the expiration time x. In some embodiments, the key producer creates the keys with pre-assigned expiration times that are far off in the future, thereby allowing the keys to reside in the trusted caches for a period of time before the key must be used or is in an operational state. This system enables the keys to be created ahead of time without risk of being deemed untrustworthy or insecure until the keys are distributed from the trusted caches. This allows the system to have access to keys even when the system has encountered a global WAN outage or partial network partitions.

In addition to the various system requirements described, some embodiments may use a connectivity frequency as a tuning parameter in determining lifecycle information for later-generated keys. For example, the connectivity frequency may be used to determine a length of each lifecycle phase, key release frequency, a length of an operational period of a key, etc. In some embodiments, the connectivity frequency may be determined based on observing past behavior (e.g., connection frequency at various nodes) within the system and parameter limitations within the system. For instance, some embodiments may determine an expected connectivity frequency based on the orbit of one or more satellites. In another instance, the connection frequency may be determined based on battery restrictions for a transmitter. Upon determining a frequency of connectivity, the system of some embodiments may adjust and/or adapt the lifecycle information predetermined for each key based on the conditions observed. In some embodiments, the key producer may dynamically create a new set of lifecycle information based on the observed behavior of the system. The key producer may then associate the new set of lifecycle information with a new set of keys upon key generation.

As mentioned, the generated keys are inserted into the key-distribution caches during the caching phase. The system of some embodiments may determine when the created keys are distributable to the key-distribution caches based on each key's expiration time pre-assigned at creation. Some embodiments compare key lifecycle information (e.g., part of the key material) with a key's pre-assigned expiration time to determine when the keys are distributable. As mentioned, the key lifecycle information may provide information on the different phases of the key lifecycle with respect to the pre-assigned expiration time. Some embodiments then determine whether a current time corresponds to a particular phase of the key.

The key may enter the caching phase if the current time corresponds to the caching phase of the key (e.g., a week prior to the key's expiration time).

In some embodiments, the key-distribution cache holds the key for a period of time until the key is determined to be distributable from the key-distribution cache. In one embodiment, keys generated and distributed to the key-distribution caches are propagated throughout all the key-distribution caches globally within a fixed period of time. In some instances, the fixed period of time may be on the order of twenty-four hours because the key-distribution caches may involve transmitting the keys across WAN links in a globally distributed system. In some instances, the WAN links may be intermittently connected or connected only for brief periods of time between long intervals of disconnection. The distributed system of some embodiments may be particularly useful for systems that have intermittently connected WAN links, such as identification friend or foe (IFF) systems, airplane systems, satellite systems, digital rights management (DRM) systems, etc.

Some embodiments have only periodic connectivity between each of the nodes or components within the system. In some embodiments, one or more keys may have breaks within the key lifecycle where one or more of the lifecycle phases for each key may be discontinuous. Some embodiments maintain at least a minimum number of keys rotated throughout the system such that at each reconnection there may be sufficient keys re-propagating for proper operation of the system.

In some embodiments, the key-distribution cache(s) 204 determines whether one or more keys may be exported from the key-distribution cache(s). Some embodiments perform this determination by comparing each key's lifecycle information with the corresponding key's pre-assigned expiration time. The key's lifecycle information may indicate the amount of time prior to the key's expiration time when the key is determined to be distributable from the key-distribution cache(s). For instance, the key's lifecycle information may indicate that the key is distributable from the key-distribution cache thirty-nine hours prior to expiration. Some embodiments hold one or more keys for a duration of time until the keys are determined to be distributable from the key-distribution caches. Holding the keys in the key-distribution caches ensures that the keys are not exposed beyond a trust boundary of the key producer and the keys are therefore pre-operational or not yet operational.

In some embodiments, the key-distribution cache may perform a put key operation and/or a retrieve key operation. The key-distribution cache may perform a put key operation to push one or more keys from the key-distribution caches to ciphertext producers 206 and/or ciphertext consumers 208. In some embodiments, the ciphertext producers and/or ciphertext consumers pull one or more keys from the key-distribution caches using the retrieve key operation. Once a key is released to a ciphertext producer and/or a ciphertext consumer, the key is operational and may be deemed as exposed (e.g., to the ciphertext producers and consumers) and potentially unreliable or untrustworthy. The window of compromise for each key is therefore the time period between each key is released to a ciphertext producer and/or a ciphertext consumer and the key's expiration time. In some embodiments, the key-distribution caches perform access control such as selective key distribution to the producers and the consumers key encryption prior to distributing the keys. A subset of the producers may receive a different set of keys from another subset of the producers in the distributed system. Likewise, different consumers may receive different sets of keys in the system.

Once a key is determined to be distributable from the key-distribution cache(s), the key has entered the distribution/fetching phase of the key's lifecycle. During the distribution/fetching phase, one or more ciphertext producers and one or more ciphertext consumers obtain a copy of the key from the key-distribution cache(s). The system of some embodiments pre-design the lifecycle of the key such that the distribution/fetching phase may be long enough to ensure that the ciphertext producers may pull at least one copy of each key or that the key-distribution cache(s) may push at least one copy of each key to the ciphertext producers. In the case where the keys are pushed from the key-distribution cache(s) to the ciphertext producers, the keys must be distributed to the ciphertext producers at a time prior to when the ciphertext producers need to use the keys for message encryption in some embodiments. In other words, the distribution phase must be long enough such that the key-distribution cache(s) may be able to push the keys out to all interested parties. Some embodiments enable the ciphertext producers to periodically pull keys from the key-distribution caches. In this case of pulling keys from the key-distribution cache(s), the fetching phase must be long enough such that every ciphertext producer and ciphertext consumer will be able to pull at least once in that interval.

The ciphertext producer 206 produces ciphertext or messages during the producing phase. When the ciphertext producer produces messages, the producer may be encrypting and/or signing information. Some embodiments determine a key's producing phase by comparing the key's lifecycle information with the pre-assigned expiration time. The system of some embodiments may determine when the ciphertext producers may stop producing (i.e., encrypting and/or signing) messages, may start releasing the encrypted and/or signed messages, and may stop releasing the messages. A customer 210 may send a request for content or resources to the ciphertext producer 206. The ciphertext producer then produces ciphertext that is encrypted and/or signed and sends the produced ciphertext back to the customer. Any service and/or application may also require separate security criteria. Various other types of security can be utilized as discussed and suggested elsewhere herein. In some embodiments, produced messages may include information that indicates whether the current time exceeds a particular timestamp, which can necessitate various components within the system to be re-synchronized in order to account for clock skew. Some embodiments use the channels used to distribute keys to distribute clock updates for controlling clock skew.

The same customer or other customer(s) may send a request to a ciphertext consumer 208 in order to decrypt the ciphertext and/or verify the signature. The ciphertext consumer 208 decrypts and/or verifies the signature during the consuming phase. The system of some embodiment determines the consuming phase by comparing the key's pre-assigned expiration time and the key's lifecycle information indicating whereupon the key should enter the consuming phase based on the expiration time. The ciphertext consumers may decrypt and/or verify signature so long as the ciphertext consumers have received a copy of the key. In some embodiments, the ciphertext consumers determine when to stop accepting messages. Upon decrypting and/or verifying the signature, the ciphertext consumer sends a response back to the customer (e.g., through a secure network connection).

Typically, the lifetime of a message is eclipsed by the shorter lifetime of a key. In some instances, such as when the original key (used to encrypt a message) may have been compromised or when a system only wants to manage a finite set of keys, a message may be desired to be kept encrypted (or as ciphertext) longer than the lifetime of the key. In these instances where a message is desired to be kept encrypted and/or signed longer than the lifetime of the key (that was used to encrypt and/or sign the message), a ciphertext renewer may be used in some embodiments to consume and/or decrypt and re-encrypt the message with a new key prior to the key's expiration time. The message may then have a lifetime that extends beyond the expiration time of the key that was originally used to encrypt the message. The system of some embodiments may check for keys that are about to expire and perform a renewal for the messages encrypted with keys that are expiring within a threshold period from expiration (e.g., an hour prior to expiration). In some embodiments, the ciphertext renewer includes one or more ciphertext producers and one or more ciphertext consumers that may take in the message encrypted under one key, decrypt it and/or check the signature, and then reproduce a new signature with a new signing key, and re-encrypt with the new signing key.

Figure 3:
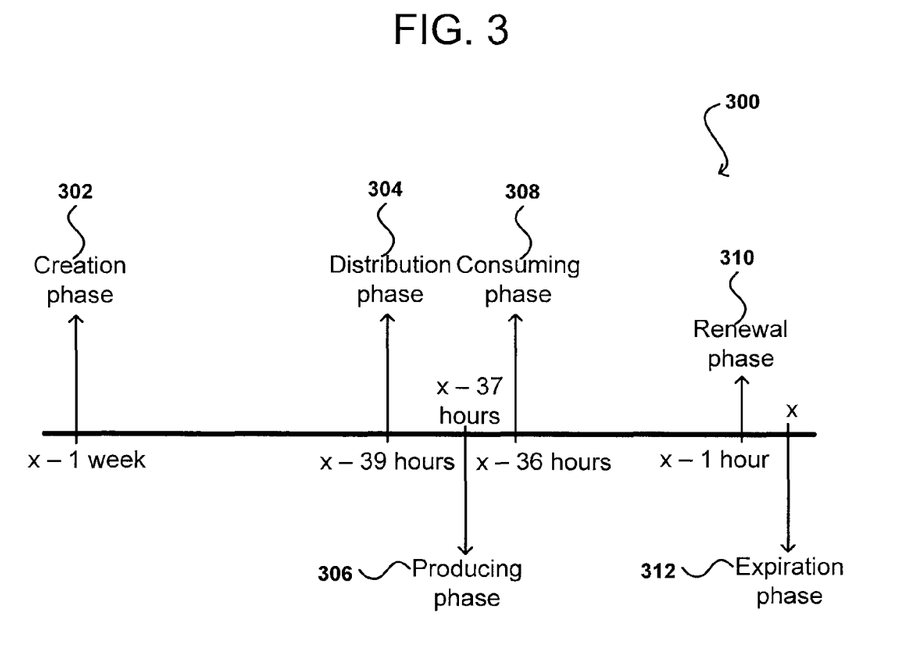
FIG. 3 illustrates an example of a timeline of a key lifecycle in accordance with some embodiments.

FIG. 3 illustrates an example of a timeline 300 of a key lifecycle in accordance with some embodiments. As mentioned above, the key lifecycle of some embodiments may include several phases including a creation/caching phase 302, a distribution/fetching phase 304, a producing phase 306, a consuming phase 308, a renewal phase 310, and an expiration phase 312. In some embodiments, the timeline may include fewer or additional phases. For instance, a pre-determined lifecycle may not incorporate a renewal phase where an encrypted message is decrypted and then re-encrypted with a new key a period prior to the original key's expiration.

The duration of each phase may be adjusted and pre-established by the system in accordance with various requirements of the system (e.g., setting the window of compromise such that it may not exceed a threshold duration, setting the maximum lifetime of a message, setting the duration of the caching phase or the interval where propagation to the caches is permitted, setting how soon to allow producers and consumers access to a key, etc.). In some embodiments, the pre-established timeline or pre-defined lifecycle information is included within the key material or the key such that the different phases may be determined based on the lifecycle information. The key's lifecycle phase is a deterministic function of the pre-assigned expiration time of each key in some embodiments. As mentioned above, the expiration time of each key may be pre-assigned at key generation. Mechanisms within the system may then determine the phase in which a key is currently residing using the pre-assigned expiration time for the key and the lifecycle information. It should be understood that use of an expiration time as the pre-assigned time is merely an example, as the pre-assigned time can be any predefined point or period within the lifecycle of a key, as described elsewhere herein.

During a creation/caching phase 302, the key producer generates one or more keys and caches the keys in one or more key-distribution caches. In some embodiments, the generated keys are distributable to the key distribution cache(s) upon being generated. The system of some embodiments may determine when the created keys are distributable to the key distribution cache(s) based on the keys' expiration time pre-assigned at creation and the lifecycle information. As mentioned above, some embodiments compare key lifecycle information with a key's pre-assigned expiration time to determine when the keys are distributable. The key lifecycle information may define the different phases that a key enters at different times defined by the expiration time. As illustrated in this example, keys are generated and distributed to the key-distribution caches upon creation in the creation/caching phase, which may be a week prior to the key's designated expiration time. In some embodiments, the key distribution caches hold each key for a period of time until the key is distributable from the key-distribution caches. Some embodiments hold the keys in the key-distribution caches for a period of time prior to being distributed to, or pulled from, the producers and the consumers such that each key's useful life does not start counting down until each of the keys are released from the key-distribution caches. Since the key-distribution caches are within a boundary of trust of the key producer, the keys are considered not exposed beyond or outside the trust boundary of the key producer while they are being held within the key-distribution caches prior to the distribution/fetching phase.

The keys are distributed from the key-distribution caches upon entering the distribution/fetching phase 304. In some embodiments, the keys are distributed to ciphertext producers and ciphertext consumers during the distribution phase. The distribution phase may be determined based on the pre-assigned expiration time of each of the keys being distributed. While in some embodiments the keys may be pushed to the ciphertext producers and/or ciphertext consumers, some embodiments enable the ciphertext producers and/or ciphertext consumers to pull from the key-distribution caches during the distribution/fetching phase. The keys may be pushed to or pulled by the ciphertext producers and/or consumers at various times throughout the distribution phase. In some instances, the ciphertext consumer may receive one or more keys necessary for encrypting and/or signing by the ciphertext producer prior to the ciphertext producer receiving the key(s). In such instances (e.g., when the ciphertext consumer is located within a threshold distance to the ciphertext producer), the ciphertext consumer may consume the message upon the production of the message by the ciphertext producer. In some embodiments, the lifecycle of a key is designed such that the distribution/fetching phase exceeds a threshold duration that every key within the key-distribution cache may be distributed to at least one ciphertext producer and ciphertext consumer or pulled from the key-distribution cache within the distribution/fetching phase. In this example, the key(s) enters the distribution/fetching phase 304 at thirty-nine hours prior to the expiration time of the key.

During the producing phase 306, the ciphertext producers produce ciphertext that is encrypted or signed using one or more keys received during the distribution/fetching phase 304. The producing phase for each key may be determined based on the pre-assigned expiration time of each key. The system of some embodiments determines that the producing phase for a key has begun by comparing the key lifecycle information and the pre-assigned expiration time. In some embodiments, the key lifecycle information may specify that the producing phase of a key is a threshold amount of time prior to the pre-assigned expiration time. Some embodiments may therefore determine that the key has entered the producing phase upon determining that a current time is the threshold amount of time prior to the pre-assigned expiration time. In this example, the key lifecycle information indicated that the producing phase 306 of the key begins at thirty-seven hours prior to the expiration of the key.

In some embodiments, the ciphertext consumer(s) consumes, decrypts, and/or verifies signature during the consuming phase 308. Some embodiments determine the consuming phase of a key by comparing the key lifecycle information to the pre-assigned expiration time of the key. In this example, the consuming phase 308 is determined to be at thirty-six hours prior to the expiration time of the key. In some embodiments, the producing phase and the consuming phase overlap for some period of time. For example, the producing phase and the consuming phase may begin at the same time, allowing a message to be produced and then immediately consumed. In another example, the consuming phase may begin prior to the end of the consuming phase. The overlap period may be one of the system requirements pre-specified and factored in when predetermining the key's lifecycle information. The consuming phase extends beyond the producing phase for at least a minimum duration of time to ensure that encrypted and/or signed messages produced during the producing phase have an opportunity to be decrypted and/or verified during the consuming phase.

Some embodiments include a renewal phase 310. In some embodiments, the renewal phase is triggered when the message is desired to be stored for a period longer than the time period that the key will be valid. In the renewal phase, some embodiments decrypt the message and/or verify the signature, reproduce a new signature with a new signing key and/or re-encrypt with the new signing key. This allows the message to have a lifetime that extends beyond the expiration of the original key with which the message was originally encrypted. The renewal phase is triggered a threshold time prior to the expiration time in some embodiments, such as an hour before the key is originally designed to expire. In some embodiments, the messages may be held by decentralized systems that may include end user devices where the holder of the message has information including the expiration time and may be responsible for the renewal process. The key enters the expiration phase 312 when the system is currently at or beyond the pre-assigned expiration time. Upon entering the expiration phase, the key is no longer valid or usable to read old messages.

Figure 4:
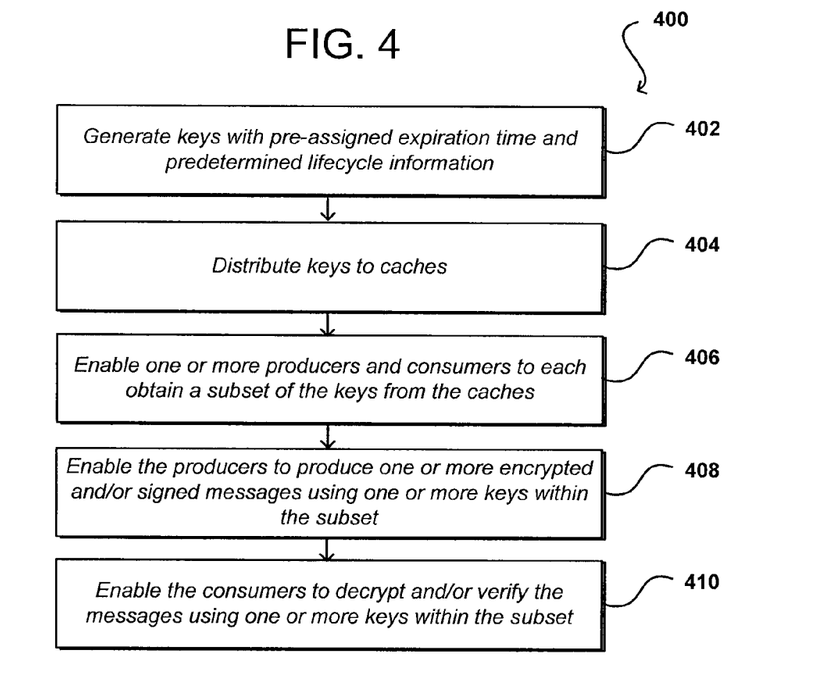
FIG. 4 illustrates an example process for managing key lifecycle in a distribution system in accordance with one embodiment.

FIG. 4 illustrates an example process 400 for managing key lifecycle in a global distribution system in accordance with one embodiment. It should be understood, however, that for any process described herein there can be additional, fewer, or alternative steps performed in similar or alternative orders, or in parallel, unless otherwise stated, within the scope of the various embodiments. In this example, several keys are generated 402 where each key has a pre-assigned expiration time and predefined lifecycle information. The predefined lifecycle information may include several pre-defined lifecycle stages that are determined based on the pre-assigned expiration time. For instance, the predefined lifecycle information may specify that the key caching phase is a week prior to the pre-assigned expiration time and that the key distribution phase is thirty-six hours prior to the pre-assigned expiration time.

In some embodiments, the key producer of the key management system generates the keys and associates each key with the predefined or predetermined lifecycle information. The system of some embodiments predetermines the lifecycle information by pre-establishing a timeline of each key's lifecycle. As mentioned above, the system may pre-establish the timeline (e.g., the duration for each lifecycle phase) by assessing a number of system requirements, such as the maximum lifetime of the message, the amount of time that the ciphertext producers and consumers may have access to the keys prior to the keys being used, the amount of time to allow for propagation of the keys to the key-distribution caches, etc. The keys are then held, propagated, and used in accordance with the predetermined lifecycle information. In some embodiments, the several keys generated and distributed to the one or more caches exceeds a threshold amount of keys such that sufficient keys may be used for encryption by various ciphertext producers and consumers in the event of a multi-hour WAN outage or network partition.

The several keys are distributed to one or more key-distribution caches during a caching phase in the several pre-defined lifecycle phases 404. The key-distribution caches are configured to hold each of the keys until a fetching phase in the several pre-defined lifecycle phases. One or more ciphertext producers and one or more ciphertext consumers are enabled to obtain a subset of the several keys from the one or more key-distribution caches during the fetching phase 406. As mentioned above, the ciphertext producers and consumers may pull the subset from the caches in some embodiments. In some embodiments, the caches may push the subset out to the ciphertext producers and consumers on a periodic basis (e.g., every two hours, every ten minutes).

One or more ciphertext producers are enabled to produce one or more encrypted/signed messages using the subset of the several keys during a producing phase 408. One or more ciphertext consumers is enabled to decrypt and/or verify the one or more encrypted and/or signed messages using the subset of the several keys during a consuming phase 410. The different phases are defined based on the predetermined lifecycle information, which specifies a time interval for each phase with respect to the key's pre-assigned expiration time.

Figure 5:
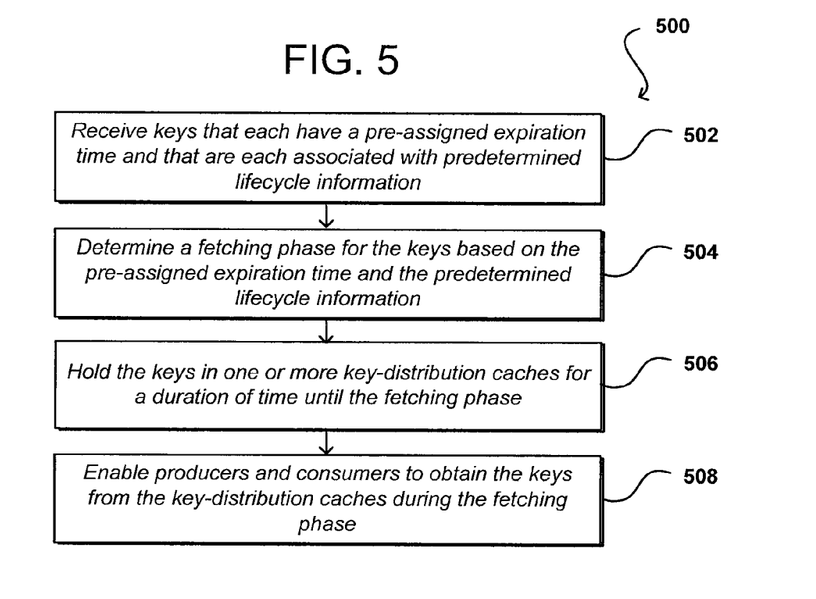
FIG. 5 illustrates an example process for managing key lifecycle in a distributed system in accordance with various embodiments.

FIG. 5 illustrates an example process 500 for managing key lifecycle in a distributed system in accordance with some embodiments. In this example, several keys are received from a key producer 502 at the key-distribution cache(s). In some embodiments, each key is a pre-assigned an expiration time and each key is associated with predetermined lifecycle information. A fetching phase is determined for one or more keys based on the pre-assigned expiration time and the predetermined lifecycle information 504. During the fetching phase, one or more keys are retrievable by one or more ciphertext producers and one or more ciphertext consumers. In some embodiments, the starting time of the fetching phase is a threshold time prior to the pre-assigned expiration time.

The several keys are held in one or more key-distribution caches for a period of time prior to the fetching phase 506. One or more ciphertext producers and one or more ciphertext consumers are enabled to obtain a copy of a subset of the several keys during the fetching phase 508. In some embodiments, the ciphertext producers and ciphertext consumers pull keys from the key-distribution cache(s) at various times throughout the fetching phase. Some embodiments push keys from the key-distribution cache(s) to the ciphertext producers and ciphertext consumers periodically. One or more ciphertext producers encrypts information using the copy of the subset of the plurality of keys during a producing phase in the plurality of phases and the one or more ciphertext consumers decrypts information using the copy of the subset of the plurality of keys during a consuming phase in the plurality of phases, both the producing phase and the consuming phase determined based on the pre-assigned expiration time.

Figure 6:
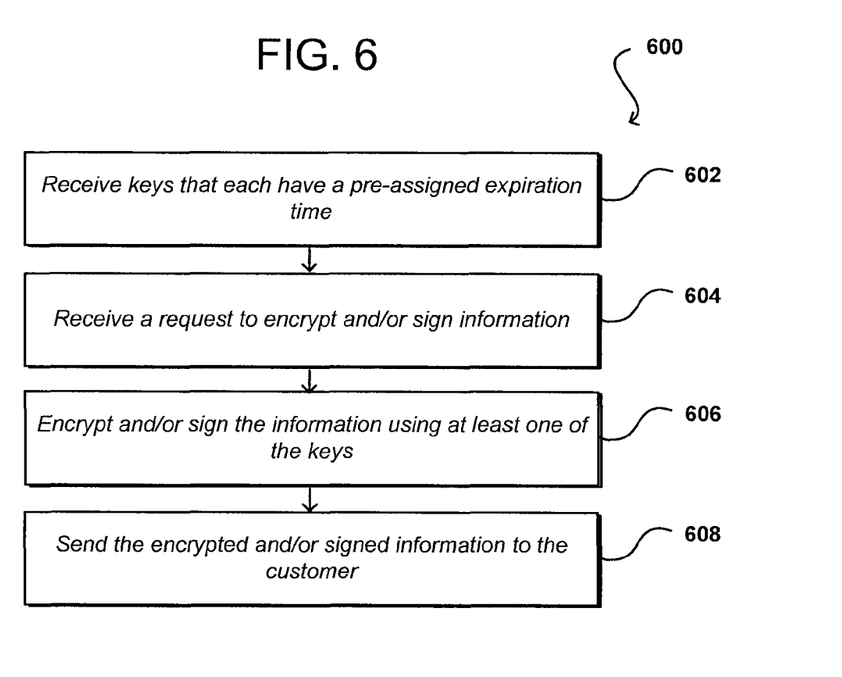
FIG. 6 conceptually illustrates an example process for managing a lifecycle of a key in a distributed system such that the key may be used for encryption and/or signing during a producing phase of the key's lifecycle in accordance with some embodiments.

FIG. 6 illustrates an example process 600 for managing a lifecycle of a key in a distributed system such that the key may be used for encryption and/or signing during a producing phase of the key's lifecycle in accordance with some embodiments. In this example, one or more keys are received from one or more key-distribution caches 602. Each key is pre-assigned an expiration time (e.g., by a key producer of the system) and associated with lifecycle information. As mentioned above, the key lifecycle information includes information that identifies when each of the several lifecycle phases begin with respect to the key's pre-assigned expiration time. For example, the key lifecycle information may indicate that the distribution phase begins thirty-eight hours prior to the key's expiration time. Further, as discussed, the key lifecycle phases may be determined based on any pre-assigned time within the key's lifecycle and the lifecycle information, which includes information indicating when each lifecycle phase begins with respect to the pre-assigned time. The one or more keys are received from the caches during a distribution phase of the key's lifecycle. The system of some embodiments set the distribution/fetching phase to be long enough such that each of the ciphertext producers may receive a copy of the keys being distributed or pulled from the key-distribution caches.

A request is received from a customer 604. Information may be encrypted and/or signed by the ciphertext producer using one or more of the keys received from the key-distribution cache(s). The request to encrypt information may be received during a producing phase. As mentioned above, the producing phase may be determined based on the pre-assigned expiration time such that keys are rotated to the ciphertext producer during the producing phase and used to encrypt and/or sign information. The information related to the request is encrypted and/or signed using the one or more keys 606 during the producing phase. The encrypted and/or signed information is then sent to the customer 608. Since the information is encrypted and/or signed, the information need not be sent to the customer through a secure connection. The customer may then send the encrypted and/or signed information to a ciphertext consumer during a consuming phase. The encrypted information is capable of being decrypted and/or verified through a ciphertext consumer using another copy of the key.

An example of the information that may be encrypted and/or signed is a security token in some embodiments. The ciphertext consumer that receives the encrypted and/or signed information may then decrypted and/or verify the signature using one or more keys received from the key-distribution cache(s) during the distribution/fetching phase. Even in the instance of a global WAN outage where the key producer goes offline for a week, the ciphertext producer and ciphertext consumer may continue to encrypt and/or sign and decrypt and/or verify signature by retrieving keys stored in the key-distribution caches.

Figure 7:
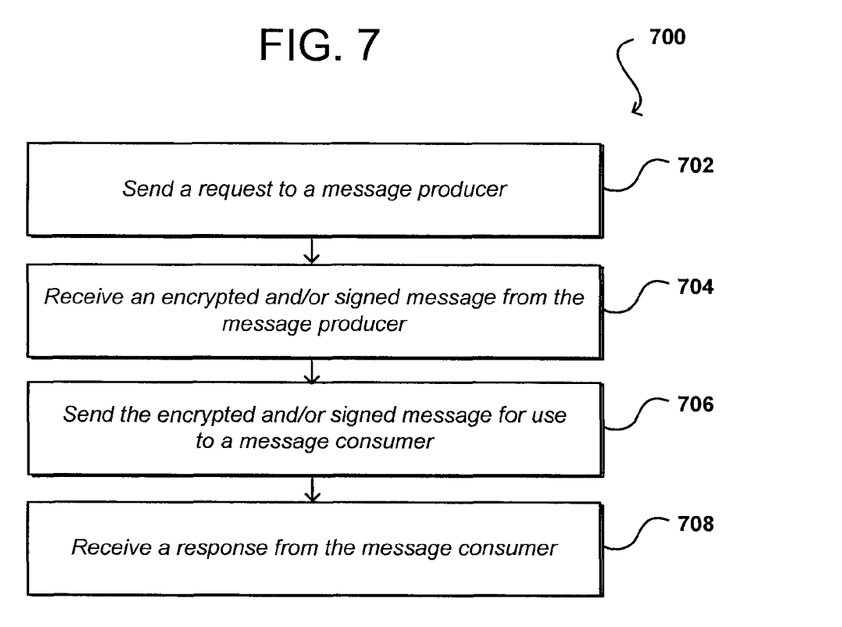
FIG. 7 conceptually illustrates an example process for using one or more encryption keys to encrypt and decrypt information during different lifecycle phases of each of the keys in accordance with some embodiments.

FIG. 7 illustrates an example process 700 for using one or more encryption keys to encrypt and decrypt information during different lifecycle phases of each of the keys in accordance with some embodiments. In this example, a request is sent to a ciphertext producer that has one or more keys usable for creating an encrypted and/or signed message 702. In some embodiments, each key has a pre-assigned expiration time and corresponding lifecycle information. The keys may be received by the ciphertext producer during a distribution/fetching phase of the several phases within each key's lifecycle. As mentioned above, each of the several phases may be identified based on the pre-assigned expiration time. If the request is received by the ciphertext producer during the producing phase of a key, the ciphertext producer may encrypt the message using the key.

The encrypted and/or signed message is received from the ciphertext producer 704. The message is encrypted and/or signed during a producing phase of the one or more keys used to encrypt and/or sign the message. The encrypted and/or signed message is sent to a ciphertext consumer for use 706 where the ciphertext consumer decrypts and/or verifies the signature. Upon decryption and/or verification of the signature, a response is received from the ciphertext consumer 708. In some embodiments, the message is decrypted and/or verified during a consuming phase of the one or more keys used.

The keys used by the ciphertext consumer and the ciphertext producer are received during a fetching phase. Some embodiments allow the producing phase and the consuming phase to overlap for a period of time. In some embodiments, the producing phase is shorter than the consuming phase such that there is at least a minimal duration of time in which a produced message may be consumed. The system of some embodiments may also factor in this requirement when pre-scheduling the duration of each lifecycle phase and when determining when each lifecycle phase begins with respect to each key's pre-assigned expiration time.

Figure 8:
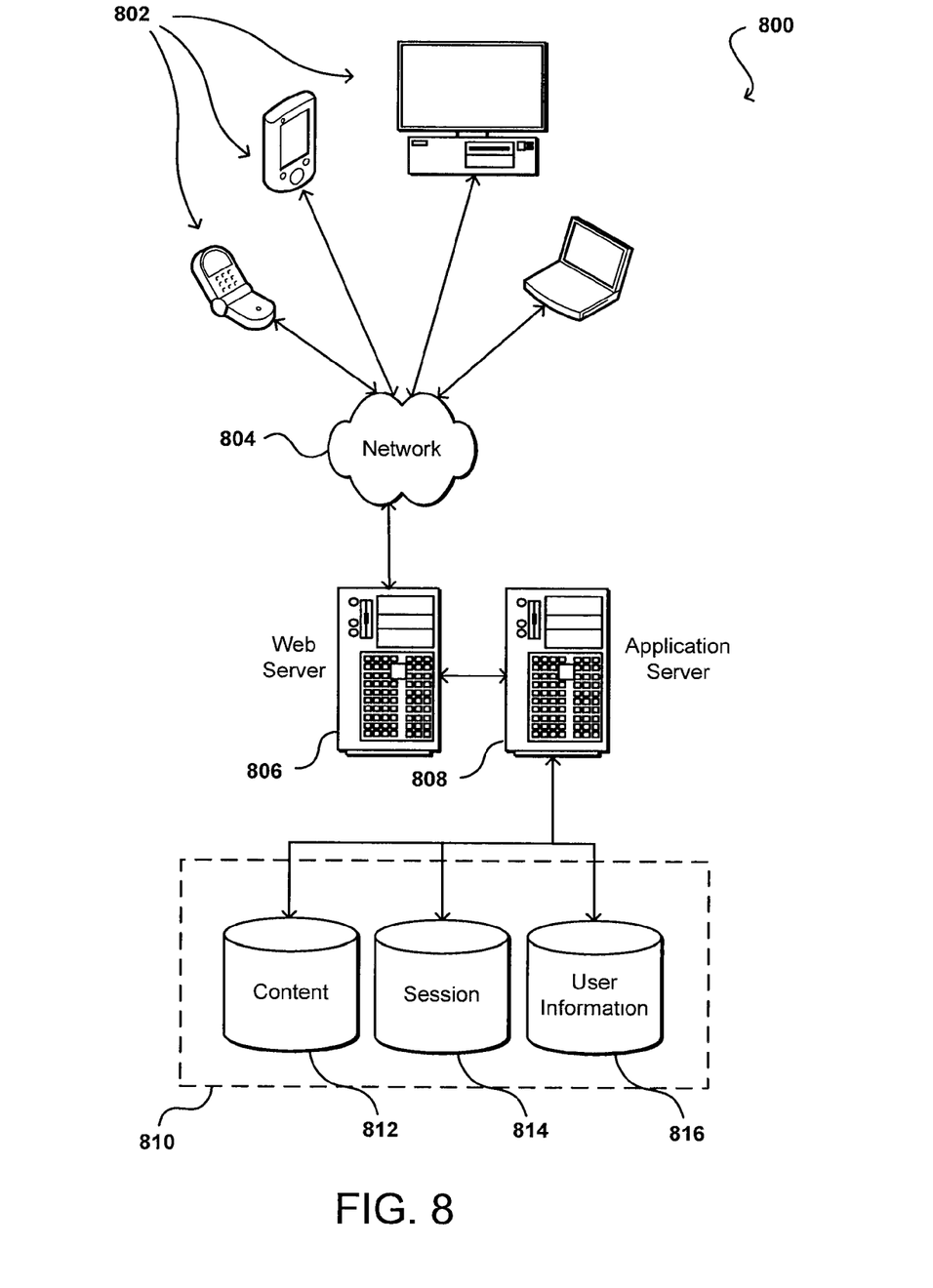
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, hand-held messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing key lifecycle in a global distributed system, the method comprising:
    generating a plurality of keys that each have a pre-assigned lifecycle time and a plurality of pre-defined lifecycle phases determined based on the pre-assigned lifecycle time, the plurality of keys being associated with lifecycle information that identifies the plurality of pre-defined lifecycle phases with respect to the pre-assigned lifecycle time of a key of the plurality of keys;
    distributing the plurality of keys to one or more key-distribution caches during a caching phase in the plurality of pre-defined lifecycle phases, the key-distribution caches configured to hold each of the plurality of keys until a fetching phase in the plurality of pre-defined lifecycle phases of each of the plurality of keys;
    during the fetching phase of each of the plurality of keys, enabling a ciphertext producer to obtain a first subset of the plurality of keys from the one or more key-distribution caches and a ciphertext consumer to obtain a second subset of the plurality of keys from the one or more key-distribution caches;
    during a producing phase in the plurality of pre-defined lifecycle phases, enabling the ciphertext producer to produce one or more messages using one or more keys within the first subset; and
    during a consuming phase in the plurality of pre-defined lifecycle phases, enabling the ciphertext consumer to consume the one or more produced messages using one or more keys within the second subset,
    wherein the ciphertext consumer is able to obtain the second subset during the fetching phase.

2. The method of claim 1, wherein the plurality of keys generated and distributed to the one or more caches exceeds a threshold amount such that at least a minimum number of keys are available to be used for encryption by the ciphertext producer and the ciphertext consumer in the event of a multi-hour WAN outage or network partition.

3. The method of claim 1 further comprising:
    determining an expected connection frequency based on an observed behavior of the distributed system;
    dynamically creating a set of lifecycle information based on the expected connection frequency; and
    associating the set of lifecycle information with a new set of keys upon generation.

4. The method of claim 1, wherein one or more keys within the first subset is different from one or more keys within the second subset.

5. The method of claim 1, wherein the first subset includes a set of private keys and the second subset includes a set of public keys.

6. The method of claim 1, wherein the ciphertext producer is a first producer in the distributed system, wherein a second producer in the distributed system receives a third subset of the plurality of keys from the one or more key-distribution caches, at least one or more keys within the first subset being different from the third subset.

7. The method of claim 1, wherein the distribution phase has a duration that exceeds a minimum pulling interval where the producer and the consumer pulls one or more keys from one or more key-distribution caches at least once during the minimum pulling interval.

8. The method of claim 1, wherein a duration of each of the plurality of pre-defined lifecycle phases is adjusted and pre-determined based on system requirements.

9. The method of claim 1, wherein the caching phase has a duration that exceeds a minimum interval where each of the key-distribution caches receives a copy of the plurality of keys.

10. The method of claim 1, wherein the lifecycle time is at least one of an expiration time or a creation time.

11. A method of managing key lifecycle in a distributed system, the method comprising:
    receiving a plurality of keys from a key producer, a key of the plurality of keys having a pre-assigned expiration time and associated with predetermined lifecycle information, the predetermined lifecycle information identifying a plurality of lifecycle phases with respect to the pre-assigned expiration time of the key;
    based on the pre-assigned expiration time and the predetermined lifecycle information, determining a fetching phase when the key is retrievable by at least one message producer and at least one message consumer, a starting time of the fetching phase being a threshold time prior to the pre-assigned expiration time;
    holding the plurality of keys for a duration of time prior to the fetching phase; and
    enabling the message producer and the message consumer to obtain a first subset of the plurality of keys and a second subset of the plurality of keys, respectively, during the fetching phase,
    wherein the message producer encrypts information and/or performs a signature using one or more keys within the first subset during a producing phase in the plurality of phases and the message consumer decrypts information and/or validates signatures using one or more keys within the second subset during a consuming phase in the plurality of phases, the plurality of lifecycle phases determined based at least in part on the pre-assigned expiration time.

12. The method of claim 11, wherein the pre-assigned expiration time is a particular time within a lifecycle of each key upon which each lifecycle phase of each key is determined.

13. The method of claim 11, wherein the predetermined lifecycle information comprises information indicating the starting time for each of the plurality of lifecycle phases with respect to a pre-assigned expiration time for one of the plurality of keys.

14. The method of claim 11, wherein the predetermined lifecycle information is pre-established based on at least one requirement of the distributed system.

15. The method of claim 11, wherein the plurality of keys are not yet operational while being held for the duration of time.

16. The method of claim 11, wherein holding the plurality of keys for the duration of time ensures that the keys are not exposed beyond a trust boundary of the key producer for the duration of time.

17. The method of claim 11, wherein the message producer is a first producer and that the first subset is selectively distributed to the first producer, the method further comprising selectively distributing a third subset of the plurality of keys to a second producer, one or more keys within the first subset being different from one or more keys within the third subset.

18. A method of managing a lifecycle of a key in a distributed system, the method comprising:
receiving one or more keys from one or more key-distribution caches during a distribution phase in a plurality of lifecycle phases, each key having a pre-assigned expiration time and each key being associated with lifecycle information, the lifecycle information identifying the plurality of lifecycle phases with respect to the pre-assigned expiration time, the plurality of lifecycle phases based at least in part on the pre-assigned expiration time;
from a customer, receiving a request to produce ciphertext using the one or more keys;
using the one or more keys, producing the ciphertext related to the request during a producing phase in the plurality of lifecycle phases; and
sending the ciphertext to the customer,
wherein the ciphertext is capable of being consumed by a consumer in a consuming phase using one or more keys received by the consumer during the distribution phase.

19. The method of claim 18, wherein the one or more keys are distributed to an intermediary from the one or more key-distribution caches distribute, wherein the one or more keys are received directly from the intermediary.

20. The method of claim 18, wherein the ciphertext is encrypted and/or signed information.

21. The method of claim 18, wherein the lifecycle information is predetermined based on the requirements of the system that includes at least one of setting a maximum duration of the lifecycle of the key.

22. The method of claim 18, wherein the lifecycle information includes information that identifies when each of the plurality of lifecycle phases begins with respect to the pre-assigned expiration time.

23. The method of claim 18, wherein a duration of the distribution phase is long enough such that both the producer and the consumer are able to obtain a copy of the same key used to encrypt and decrypt the information related to the request.

24. The method of claim 18, wherein the information is a security token.

25. The method of claim 18, wherein the one or more keys are received by pulling the one or more keys from the key-distribution caches.

26. The method of claim 18, wherein the one or more keys are received upon the one or more key-distribution caches pushing the one or more keys to the producer.

27. A non-transitory computer-readable storage medium storing a computer program for providing access to secure data, the computer program comprising instructions executable by a processor for:
sending a request to a producer that has one or more keys usable for producing a message, each of the keys having a pre-assigned expiration time and lifecycle information that includes information for a plurality of phases, the lifecycle information identifying a plurality of phases with respect to the pre-assigned expiration time;
receiving the produced message from the producer, the message produced during a producing phase of the plurality of phases;
sending the produced message to a consumer for consumption; and
upon the message being consumed during a consuming phase of the plurality of phases, receiving a response from the consumer,
wherein the one or more keys used by the producer are received during a fetching phase of the plurality of phases, each of the plurality of phases determined based on the pre-assigned expiration time and the lifecycle information.

28. The non-transitory computer-readable storage medium of claim 27, wherein the lifecycle information includes information that indicates when each of the plurality of phases begin with respect to the key's pre-assigned expiration time.

29. The non-transitory computer-readable storage medium of claim 27, wherein the lifecycle information is pre-established based on various system requirements such that each of the keys created is rotated throughout the system based on its corresponding lifecycle information.

30. A system of managing key lifecycle in a distributed system, the system comprising:
a processor; and
a memory device including instructions that, when executed by the processor, cause the system to:
receive a plurality of keys from a key producer, a key of the plurality of keys having a pre-assigned expiration time and associated with predetermined lifecycle information, the predetermined lifecycle information identifying a plurality of phases with respect to the pre-assigned expiration time of the key;
based on the pre-assigned expiration time and the predetermined lifecycle information, determine a fetching phase in the plurality of phases when the key is retrievable by at least one message producer and at least one message consumer, a starting time of the fetching phase being a threshold time prior to the pre-assigned expiration time;
hold the plurality of keys for a duration of time prior to the fetching phase; and
enable the message producer and the message consumer to obtain a first subset of the plurality of keys and a second subset of the plurality of keys, respectively, during the fetching phase,
wherein the message producer encrypts information and/or performs a signature using one or more keys within the first subset during a producing phase in the plurality of phases and the message consumer decrypts information and/or validates signatures using one or more keys within the second subset during a consuming phase in the plurality of phases, the plurality of phases determined based at least in part on the pre-assigned expiration time.

31. The system of claim 30, wherein the message producers and the message consumers obtain the first subset and the second subset during the fetching phase by pulling each of the first subset and the second subset from one or more key-distribution caches.

32. The system of claim 30, wherein the plurality of keys are operational upon the starting time of the fetching phase until the pre-assigned expiration time.

\* \* \* \* \*